US012651000B1

(12) United States Patent
Shanmugham et al.

(10) Patent No.: US 12,651,000 B1
(45) Date of Patent: Jun. 9, 2026

(54) SYSTEM AND METHOD FOR HISTORICAL DATA RETRIEVAL FROM OPC UA HISTORIAN WITHOUT CONTINUATION POINTS

(71) Applicant: Honeywell International Inc., Charlotte, NC (US)

(72) Inventors: Sivasankari Shanmugham, Bangalore (IN); Mudunuru Sai Krishna, Telangana (IN); Lakhankumar Tarachand Rathi, Khamgaon (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/047,661

(22) Filed: Feb. 7, 2025

(51) Int. Cl.
G06F 16/248 (2019.01)

(52) U.S. Cl.
CPC .................................. G06F 16/248 (2019.01)

(58) Field of Classification Search
CPC .................................................... G06F 16/248
See application file for complete search history.

(56) References Cited

U.S. PATENT DOCUMENTS

| | | | | |
|---|---|---|---|---|
| 12,511,131 B2 * | 12/2025 | Kumar | .................. | G06F 9/4411 |
| | | | | 707/737 |
| 2025/0088201 A1 * | 3/2025 | Przybylski | ................ | G06F 8/61 |
| | | | | 707/737 |
| 2025/0123849 A1 * | 4/2025 | Kumar | .................. | G06F 9/4411 |
| | | | | 707/737 |

FOREIGN PATENT DOCUMENTS

| | | | | |
|---|---|---|---|---|
| CN | 118863530 A | * | 10/2024 | ............. G06F 18/27 |

OTHER PUBLICATIONS

Kirdan et al. "Real- Time Performance of OPC UA" (Year: 2023).*

* cited by examiner

*Primary Examiner* — Yuk Ting Cho
(74) *Attorney, Agent, or Firm* — Alston & Bird LLP

(57) ABSTRACT

Various embodiments described herein relate to a method and system for data communication with OPC UA historian data source that lacks support for continuation points. The system comprises one or more processors and a memory enabling the processor to transmit a first request from an OPC UA client to at least two historian data sources to receive historical data at a first time frame and accordingly receive a first response from a first data source that lacks support for continuation point at a second time frame. Then the processor determines that the second end-time is different from the first end-time and accordingly transmits a second request from the OPC UA client to the first data source with a third time frame. The processor repeats transmission of additional requests to the first data source by incrementing end-time of new time frames to retrieve remaining historical data within the first time frame.

20 Claims, 4 Drawing Sheets

400

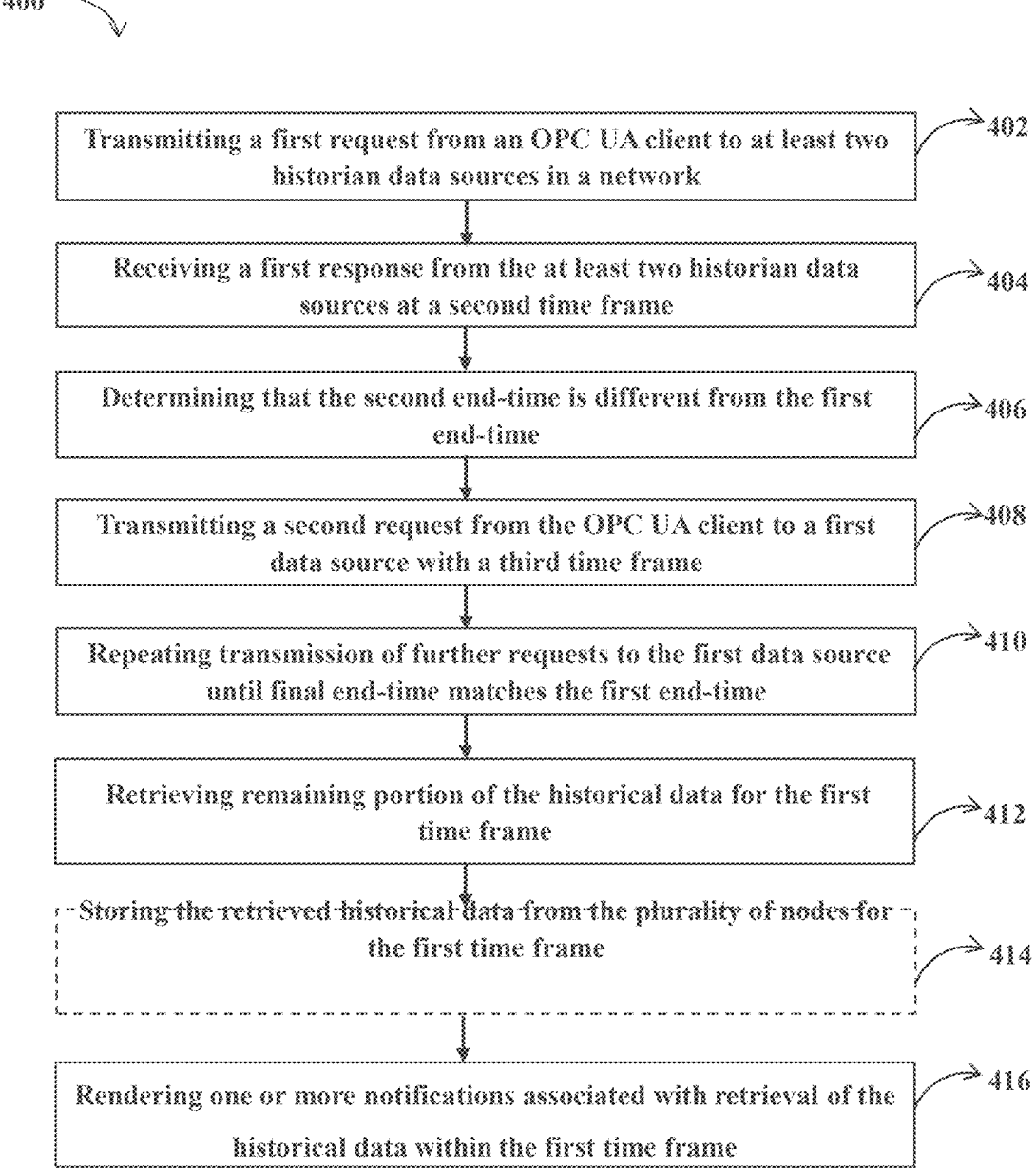

Transmitting a first request from an OPC UA client to at least two historian data sources in a network                                      402

Receiving a first response from the at least two historian data sources at a second time frame                                      404

Determining that the second end-time is different from the first end-time                                      406

Transmitting a second request from the OPC UA client to a first data source with a third time frame                                      408

Repeating transmission of further requests to the first data source until final end-time matches the first end-time                                      410

Retrieving remaining portion of the historical data for the first time frame                                      412

Storing the retrieved historical data from the plurality of nodes for the first time frame                                      414

Rendering one or more notifications associated with retrieval of the historical data within the first time frame                                      416

FIG.4

SYSTEM AND METHOD FOR HISTORICAL DATA RETRIEVAL FROM OPC UA HISTORIAN WITHOUT CONTINUATION POINTS

TECHNICAL FIELD OF INVENTION

Various embodiments of the present disclosure relate generally to data communication and processing in a network and more particularly to system and method for historical data retrieval from Open Platform Communication Unified Architecture (OPC UA) historian without continuation points that does not support continuation points.

BACKGROUND

Open Platform Communication Unified Architecture (OPC UA) is used in wide range of Industrial and automation applications to enable secure and standardized communication between devices, systems, and software. For example, monitoring and controlling process on the factory floor real-time data exchange between machines. The OPC UA is client-server-based application that enables data communication between plant (for example, monitoring devices and sensors) and enterprise systems (database, Enterprise Resource Planning systems and analytic tools) securely. In this client-server-based application, OPC UA aggregator gathers data from OPC data sources and provides data access to an OPC UA client. For instance, when an OPC UA client sends a single request (REQ1) for historical data involving multiple nodes (for example, 100 nodes of data points requested in the single request) to the OPC UA aggregator, then the request is redirected to multiple OPC UA Historians. For example, considering two OPC UA Historians (for example, PHD (data source 1 (DS 1)) and Matrikon™ Flex SDK (data source 2 (DS 2)) for history data retrieval or data communication. In this, one of the OPC Historian (i.e. DS 2) supports Continuation Point (CP) and the other OPC UA Historian (i.e. DS 1) not supports the CP. In the historical data retrieval process, the CP indicates a point from which to resume reading the historical data in the event that not all values can be returned in a response (i.e. a single response). When the response to the data request (i.e. REQ 1) received for both data source 1 and 2 (i.e. DS1 and DS2), then the OPC UA client may not be aware of whether there are more samples per request is available in the OPC UA server. Here, the REQ1 is sent with a requested data that includes 'Starting Time', 'Ending Time' and 'Nodes IDs' as parameter.

In factory environments, there is a potential data loss in responses received from DS1 due to lack of support for CP during the data retrieval process. That is, if the DS1 cannot return all requested data in a single response, then there is a risk that some data may be missing, leading to incomplete data records. This issue is more likely to occur in scenarios where a factory architecture involves large number of sensors deployed at the L1 level, responsible for collecting raw data from various processes. These sensors feed data into aggregators present at the L2 level, which process and consolidate the information for higher-level systems. At L3 level, additional aggregators and a chain of interconnected data sources are deployed, further refining and relaying the data for analysis or decision making. The complexity of this layered architecture, combined with the high volume of data exchanges and dependencies between different levels, increases the likelihood of errors, delays or data loss during transmission, particularly at the L3 level where the final chain of data sources operates. Factors such as network congestion, hardware limitations, or synchronization issues within this multi-tiered system can exacerbate the problem, making robust data integrity measures critical in such settings. Therefore, there is a need for a system and method to identify the presence of data within a specified time frame for requests made to an OPC UA historian data source that does not support continuation points. Further, there is a need for system and method to retrieve missing data from the historical data at desired time frame and also to prevent data loss.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods for historical data retrieval from Open Platform Communication Unified Architecture (OPC UA) historian without continuation points (i.e. historian data source that does not support continuation points) are described.

According to one aspect, embodiments of the present invention feature the system for data communication (i.e. data response or retrieval) with the Open Platform Communication Unified Architecture (OPC UA) Historian that is not supporting the continuation points. Specifically, the embodiments of the present invention feature the system for identifying the presence of data within a specified time frame for requests made to an OPC UA Historian that does not support continuation points during data retrieval process. The system comprises at least one non-transitory computer-readable storage medium having computer-coded instructions stored thereon. The computer-coded instructions are executed by one or more processors. The processor is configured to initially transmit a first request from an OPC UA client to at least two historian data sources in a factory environment or network to receive historical data at a first time frame. Here, the first time frame comprises at least a first start-time and a first end-time. The at least two historian data sources comprise, but are not limited to, a first data source and a second data source. After transmitting the first request, the processor is configured to receive at least a first response from the plurality of nodes associated with a first data source among the at least two historian data sources at a second time frame. The first response comprises responses from the plurality of nodes associated with both the first data source and the second data source of the at least two historian data sources. The second time frame comprises at least the first start-time and a second end-time. When the first response is received from the at least two historian data sources during the second time frame, then the processor is configured to determine whether the second end-time is different from the first end-time.

Upon determining that the second end-time differs from the first end-time, the processor is configured to transmit a second request from the OPC UA client to the first data source with a third time frame. In the data retrieval process, the second request is transmitted only to the first data source with the third time frame, as the first data source lacks support for continuation points. The third time frame comprises but is not limited to at least a third start-time and the first end-time. Further, the third start-time is an incremental value of second end-time and the incremental value may be at least one millisecond. Then, the processor is configured to repeat transmission of further requests (additional requests) to the first data source by incrementing end-time of new time frames to receive a second response from the first data source, until final end-time matches the first end-time (i.e. the end-time of the desired time frame) to retrieve the historical data within the first time frame. Here the final end-time refers to the end-time specified in the responses received for the additional requests sent by the processor. When the processor sends multiple requests to the data source to retrieve historical data, each response may cover a different time frame. The 'final end-time' is the end-time of the last response received, which completes the data retrieval process for the entire specified period (i.e. the first time frame). Further, when the final end-time matches the first end-time, the processor is configured to render, via a user interface of the OPC UA client, one or more notifications associated with retrieval of the historical data within the first time frame. These notifications inform the user that the historical data retrieval for the specified time frame is complete. Essentially, once the processor has successfully gathered all the required historical data up to the first end-time, the notifications are triggered to update the user on the completion status of the data retrieval process.

In some embodiments, the first request is a common request transmitted by the processor to the first data source and the second data source of the at least two historian data sources. The first request may comprise at least but is not limited to at least the first time frame for the historical data being requested, and identity of a plurality of nodes associated with the at least two historian data sources in the network.

In some embodiments, the first response from the first data source of the at least two historian data sources may comprise at least a portion of the historical data available within the second time frame. Further, the second response may comprise at least a portion of the historical data available within the third time frame.

In some embodiments, the second request to the first data source among the at least two historian data sources comprise at least the third time frame for the historical data being requested, and identity of plurality of nodes associated with the first data source. Further, the plurality of nodes associated with the first data source is further associated to the first request that is transmitted to the first data source of the at least two historian data sources.

In some embodiments, the processor is further configured to store the retrieved historical data from the plurality of nodes associated with the at least two historian data sources for the first time frame.

In some embodiments, the processor is further configured to receive at least a first response from a plurality of nodes associated with the second data source of the at least two historian data sources along with a continuation point for each of the plurality of nodes. Here, the continuation point indicates a point from which to resume reading the historical data in the event that not all values can be returned in the first response. Further, the processor is configured to transmit a third request from the OPC UA client to the second data source of the at least two historian data sources along with the continuation point for each of the plurality of nodes. Based on the third request, the processor is configured to receive a second response from the second data source. Here, the second data source supports for the continuation point during communication of the historical data with the OPC UA client. The processor is further configured to repeat transmission of further requests to the second data source until reception of GoodNoData signal from each of the plurality of nodes associated with the second data sources to retrieve remaining portion of the historical data for the first time frame. Here, the plurality of nodes associated with the second data source is further associated to the first request transmitted to the second data source of the at least two historian data sources.

According to another aspect, example embodiments of the present disclosure include the method for data communication (i.e. data response or retrieval) with the Open Platform Communication Unified Architecture (OPC UA) Historian that is not supporting the continuation points. Specifically, the method for identifying the presence of data within a specified time frame for requests made to an OPC UA Historian that does not support continuation points during the data retrieval process. The system comprises at least one non-transitory computer-readable storage medium having computer-coded instructions stored thereon. The computer-coded instructions are executed by one or more processors. The method is performed by the one or more processors. Initially, the processor transmits a first request from an OPC UA client to at least two historian data sources in a network to receive historical data at a first time frame. Here, the first time frame comprises at least a first start-time and a first end-time. Then the processor receives at least a first response from a plurality of nodes associated with the at least two historian data sources at a second time frame. The second time frame comprises at least the first start-time and a second end-time. When the first response is received from the at least two historian data sources during the second time frame, then the processor determines that the second end-time is different from the first end-time. Upon determining that the second end-time differs from the first end-time, the processor transmits a second request from the OPC UA client to a first data source of the at least two historian data sources with a third time frame to receive a second response from the first data source. Here, the first data source lacks support for continuation points during communication of the historical data to the OPC UA client. The third time frame comprises but is not limited to a third start-time and the first end-time. Further, the third start-time is an incremental value of second end-time. Then the processor repeats transmission of further requests to the first data source until final end-time matches the first end-time to retrieve remaining portion of the historical data for the first time frame. The 'final end-time' is the end-time of the last response received, which completes the data retrieval process for the entire specified period (i.e. the first time frame). Further, when the final end-time matches the first end-time, the processor renders, via a user interface of the OPC UA client, one or more notifications associated with retrieval of the historical data within the first time frame.

In some embodiments, the first request is a common request transmitted by the processor to the first data source and the second data source of the at least two historian data sources. The first request may comprise at least but is not limited to at least the first time frame for the historical data being requested, and identity of a plurality of nodes associated with the at least two historian data sources in the network.

In some embodiments, the first response from the first data source of the at least two historian data sources may comprise at least a portion of the historical data available within the second time frame. Further, the second response may comprise at least a portion of the historical data available within the third time frame.

In some embodiments, the second request to the first data source among the at least two historian data sources comprise at least the third time frame for the historical data being requested, and identity of plurality of nodes associated with the first data source. Further, the plurality of nodes associated with the first data source is further associated to the first request that is transmitted to the first data source of the at least two historian data sources.

In some embodiments, the processor further stores the retrieved historical data from the plurality of nodes associated with the at least two historian data sources for the first time frame.

In some embodiments, the processor further receives at least a first response from a plurality of nodes associated with the second data source of the at least two historian data sources along with a continuation point for each of the plurality of nodes. Here, the continuation point indicates a point from which to resume reading the historical data in the event that not all values can be returned in the first response. Further, the processor is configured to transmit a third request from the OPC UA client to the second data source of the at least two historian data sources along with the continuation point for each of the plurality of nodes. Based on the third request, the processor is configured to receive a second response from the second data source. Here, the second data source supports for the continuation point during communication of the historical data with the OPC UA client. The processor is further configured to repeat transmission of further requests to the second data source until reception of GoodNoData signal from each of the plurality of nodes associated with the second data sources to retrieve remaining portion of the historical data for the first time frame. Here, the plurality of nodes associated with the second data source is further associated to the first request transmitted to the second data source of the at least two historian data sources.

According to another aspect, embodiments of the present invention feature a computer program product comprising at least one non-transitory computer-readable storage medium having computer-readable program code portions stored therein. The computer-readable program code portions comprise an executable portion configured to transmit a first request from an Open Platform Communication Unified Architecture (OPC UA) client to at least two historian data sources in a network to receive historical data at a first time frame. Here, the first time frame comprises at least a first start-time and a first end-time. The at least two historian data sources comprise, but are not limited to, a first data source and a second data source. After transmitting the first request, the processor is configured to receive at least a first response from the plurality of nodes associated with a first data source among the at least two historian data sources at a second time frame. The first response comprises responses from the plurality of nodes associated with both the first data source and the second data source of the at least two historian data sources. The second time frame comprises at least the first start-time and a second end-time. When the first response is received from the at least two historian data sources during the second time frame, then the processor is configured to determine whether the second end-time is different from the first end-time.

Upon determining that the second end-time differs from the first end-time, the processor is configured to transmit a second request from the OPC UA client to the first data source with a third time frame. In the data retrieval process, the second request is transmitted only to the first data source with the third time frame, as the first data source lacks support for continuation points. The third time frame comprises but is not limited to at least a third start-time and the first end-time. Further, the third start-time is an incremental value of second end-time and the incremental value may be at least one millisecond. Then, the processor is configured to repeat transmission of further requests (additional requests) to the first data source by incrementing end-time of new time frames to receive a second response from the first data source, until final end-time matches the first end-time (i.e. the end-time of the desired time frame) to retrieve the historical data within the first time frame. Here the final end-time refers to the end-time specified in the responses received for the additional requests sent by the processor. When the processor sends multiple requests to the data source to retrieve historical data, each response may cover a different time frame. The 'final end-time' is the end-time of the last response received, which completes the data retrieval process for the entire specified period (i.e. the first time frame). Further, when the final end-time matches the first end-time, the processor is configured to render, via a user interface of the OPC UA client, one or more notifications associated with retrieval of the historical data within the first time frame. These notifications inform the user that the historical data retrieval for the specified time frame is complete. Essentially, once the processor has successfully gathered all the required historical data up to the first end-time, the notifications are triggered to update the user on the completion status of the data retrieval process.

The above summary is provided merely for the purpose of summarizing some example embodiments to provide a basic understanding of some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 illustrates an exemplary method for data retrieval using the Open Platform Communication Unified Architecture (OPC UA) Historian data sources in accordance with one or more example embodiments described herein.

DETAILED DESCRIPTION

Figure 1:
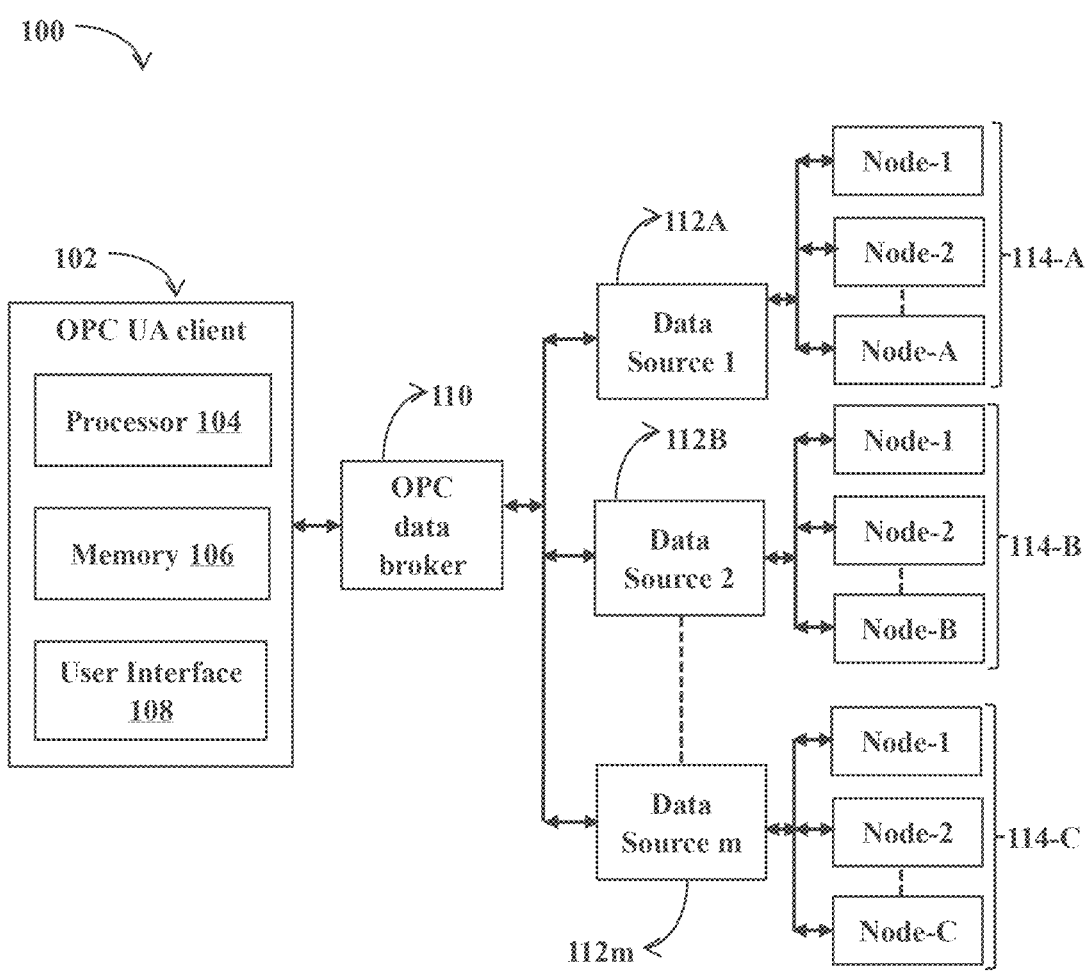
FIG. 1 illustrates a schematic block diagram showing a system for data retrieval using an Open Platform Communication Unified Architecture (OPC UA) Historian data sources in accordance with one or more example embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "OPC UA" refers to Open Platform Communication Unified Architecture. The OPC UA is client-server-based application that enables data communication between plant (for example, monitoring devices and sensors) and enterprise systems (database, Enterprise Resource Planning systems and analytic tools) securely.

The term "continuation point" or "CP" typically refers to a specific location or marker within a process or sequence where operations can resume after being paused or interrupted. The CP indicates a point from which to resume reading historical data (i.e. previously recorded/stored data available at the data source or server) in the event that not all values can be returned in a response (i.e. a single response). For example, in data processing, a continuation point might be where data processing can restart after a failure or interruption.

The term "GoodNoData signal" refers to a signal from the data source indicating that no data available at a requested node among the plurality of the nodes during a requested time frame. Despite the absence of data, the signal confirms that the system is functioning correctly and that the lack of data is expected or normal for that particular node and time period/frame.

The term "historian data source" or "an OPC historian data source" refers to a type of data storage system used in industrial automation and control systems. OPC (OLE for Process Control) is a set of standards and protocols for communicating with industrial hardware and software. A historian is a specialized database designed to store and retrieve time-series data, such as process measurements and control system data. The OPC historian data source collects and archives data from various OPC-compliant devices and systems, allowing for historical data analysis, reporting, and trend analysis. This data can be crucial for monitoring system performance, troubleshooting issues, and optimizing processes.

Various embodiments of the present disclosure relate generally to systems and methods for data communication (i.e. data response or retrieval) with the Open Platform Communication Unified Architecture (OPC UA) Historian that is not supporting the continuation points. Specifically, the system and method for identifying the presence of data within a specified time frame for requests made to an OPC UA Historian that does not support continuation points during data retrieval process. The system comprises one or more processors, a memory, an OPC UA client, a plurality of data sources and at least one OPC UA data broker. The OPC UA client is communicatively coupled with the OPC UA historian data sources through the at least one OPC UA data broker (for example, Matrikon™ Data Broker, MDB) associated with the factory environment or warehouse. The system comprises at least one non-transitory computer-readable storage medium having computer-coded instructions stored thereon. The computer-coded instructions are executed by the one or more processors. The processor is configured to initially transmit a first request from an OPC UA client to at least two historian data sources in a factory environment or network to receive historical data at a first time frame. Here, the first time frame comprises at least a first start-time and a first end-time. The first request is a common request to the at least two historian data sources and the first request comprises at least but is not limited to the first time frame for the historical data being requested, and identity of a plurality of nodes associated with the at least two historian data sources in the network. The at least two historian data sources comprise, but are not limited to, a first data source and a second data source.

After transmitting the first request, the processor is configured to receive at least a first response from the plurality of nodes associated with the at least two historian data sources at a second time frame. The first response comprises responses from the plurality of nodes associated with both the first data source and the second data source of the at least two historian data sources. The second time frame comprises at least the first start-time and a second end-time. Here, the first data source among the at least two historian data sources does not support continuation points (CPs) during the data retrieval process. The continuation point indicates a point from which to resume reading the historical data in the event that not all values can be returned in a single response (i.e. first response). The first response received from the first data source comprises at least a portion of the historical data available within the second time frame (i.e. no continuation points provided in the first response by the first data source). Additionally, the second data source of the at least two historian data sources support the continuation point during the data retrieval. Further, the first response received from the second data source comprises at least a portion of the historical data available within the second time frame, and the continuation points for retrieval of the historical data from each of the plurality of nodes associated with the second data source. When the first response is received from the at least two historian data sources during the second time frame, the processor is configured to determine whether the second end-time is different from the first end-time. That is, the processor is configured to determine whether the second end-time is less than expected end-time (i.e. the first end-time) or not.

Upon determining that the second end-time differs from the first end-time, the processor is configured to transmit a second request from the OPC UA client to the first data source with a third time frame. In the data retrieval process, the second request is transmitted only to the first data source with the third time frame, as the first data source lacks support for continuation points. The third time frame comprises but is not limited to at least a third start-time and the first end-time. Further, the third start-time is an incremental value of second end-time and the incremental value may be at least one millisecond. Then, the processor is configured to repeat transmission of further requests (additional requests) to the first data source by incrementing end-time of new time frames to receive a second response from the first data source, until final end-time matches the first end-time (i.e. the end-time of the desired time frame) to retrieve the historical data within the first time frame. Here the final end-time refers to the end-time specified in the responses received for the additional requests sent by the processor. When the processor sends multiple requests to the data source to retrieve historical data, each response may cover a different time frame. The 'final end-time' is the end-time of the last response received, which completes the data retrieval process for the entire specified period (i.e. the first time frame). Further, when the final end-time matches the first end-time, the processor is configured to render, via a user interface of the OPC UA client, one or more notifications associated with retrieval of the historical data within the first time frame. These notifications inform the user that the historical data retrieval for the specified time frame is complete. Essentially, once the processor has successfully gathered all the required historical data up to the first end-time, the notifications are triggered to update the user on the completion status of the data retrieval process.

The system and method for data retrieval using the Open Platform Communication Unified Architecture (OPC UA) Historian data sources is described further in relation with FIG. 1 to FIG. 4. Specifically, the exemplary signal flow diagram of the system for data retrieval using the OPC UA Historian data sources that lacks support for continuation point are described further in relation with FIG. 2 and FIG. 3.

FIG. 1 illustrates a schematic block diagram showing a system 100 for data retrieval using Open Platform Communication Unified Architecture (OPC UA) Historian data sources, in accordance with one or more example embodiments described herein. The system for data communication (i.e. data response or retrieval) with the Open Platform Communication Unified Architecture (OPC UA) Historian that is not supporting the continuation points. Specifically, the system for identifying the presence of data within a specified time frame for requests made to an OPC UA Historian that does not support continuation points during the data retrieval process. Referring to FIG. 1, in one or more example embodiments, the system 100 comprises an Open Platform Communication Unified Architecture (OPC UA) client 102, an OPC data broker 110, and a plurality of OPC UA Historian data sources (112A, 112B, . . . 112C) or data sources. Each of the plurality of OPC UA Historian data sources (112A, 112B, . . . 112C) comprises but are not limited to plurality of nodes (114A, 114B, . . . 114C) and other components. For example, the plurality of nodes associated with the first data source 112A may be node1 (114-A1), node2 (114-A2), . . . node-A (114-AA). Similarly, the plurality of nodes associated with the second data source 112B may be node1 (114-B1), node2 (114-B2), . . . node-B (114-BB). The plurality of nodes (114A, 114B, . . . 114C) exchanges encapsulated information or data with the OPC UA client 102 through the data sources (112A, 112B, 112C) and the OPC data broker 110. The system 100 described herein may include a set of instructions that can be executed to cause the system 100 to perform any one or more of the methods or computer-based functions disclosed herein. In some example embodiment, the system 100 may be integrated with the cloud (not shown). The system 100 may operate as a standalone device or may be connected, e.g., using a network, to other computer systems or peripheral devices.

Methods, systems, and computer program products of the present disclosure may be embodied by any of a variety of devices. For example, the method, systems, and computer program product of an example embodiment may be embodied by a networked device (e.g., system 100), such as a server or other network entity, configured to communicate with one or more devices, such as one or more client devices. Additionally, or alternatively, the computing device may include fixed computing devices, such as a personal computer or a computer workstation. Additionally, or alternatively, example embodiments may be embodied by any of a variety of mobile devices, such as a portable digital assistant (PDA), mobile telephone, smartphone, laptop computer, tablet computer, wearable, or any combination of the aforementioned devices.

As illustrated in FIG. 1, the system 100 comprises at least one non-transitory computer-readable storage medium or memory having computer-coded instructions stored thereon. The computer-coded instructions are executed by one or more processors. The OPC UA client 102 includes but is not limited to the one or more processors 104, memory 106 and a user interface 108 and other similar components. The processor 104 may be a component in a variety of systems. For example, the processor 104 may be part of a standard computer. The processor 104 may be one or more general processors, digital signal processors, application specific integrated circuits, field programmable gate arrays, servers, networks, digital circuits, analog circuits, combinations thereof, or other now known or later developed devices for analyzing and processing data. The processor 104 may implement a software program, such as code generated manually (i.e., programmed).

The OPC UA client 102 may include the memory 106 that can communicate via a bus. The memory 106 may be a main memory, a static memory, or a dynamic memory. The memory 106 may include but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 106 includes a cache or random-access memory for the processor 104. In alternative implementations, the memory 106 is separate from the processor 104, such as a cache memory of a processor, the system memory, or other memory. The memory 106 may be an external storage device or database for storing data. Examples include a hard drive, compact disc ("CD"), digital video disc ("DVD"), memory card, memory stick, floppy disc, universal serial bus ("USB") memory device, or any other device operative to store data such as historical data and the like. The memory 106 is operable to store instructions executable by the processor 104. The functions, acts or tasks illustrated in the figures or described herein may be performed by the processor 104 executing the instructions stored in the memory 106. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the OPC UA client 102 may further include a user interface or display 108, such as a liquid crystal display (LCD), an organic light emitting diode (OLED), a flat panel display, a solid-state display, a cathode ray tube (CRT), a projector, a printer or other now known or later developed display device for outputting determined information. The display 108 may act as an interface for the user to see the functioning of the processor 104, or specifically as an interface with the software stored in the memory 106 or in a drive unit. Additionally, the OPC UA client 102 may include an input/output device (not shown in figure) configured to allow a user to interact with any of the system 100. The input/output device may be a number pad, a keyboard, or a cursor control device, such as a mouse, or a joystick, touch screen display, remote control, or any other device operative to interact with the system 100. The system 100 may also or alternatively include the drive unit (not shown in figure) implemented as a disk or optical drive. The drive unit may include a computer-readable medium in which one or more sets of instructions, e.g. software, can be embedded. Further, the instructions may embody one or more of the methods or logic as described herein. The instructions may reside completely or partially within the memory 106 and/or within the processor 104 during execution by the system 102. The memory 106 and the processor 104 also may include computer-readable media as discussed above.

In some systems, a computer-readable medium includes instructions or receives and executes instructions responsive to a propagated signal so that a device connected to a network can communicate voice, video, audio, images, or any other data over the network. Further, the instructions may be transmitted or received over the network via a communication port or interface, and/or using a bus. The communication port or interface may be a part of the processor or may be a separate component. The communication port or interface may be created in software or may be a physical connection in hardware. The communication port/interface may be configured to connect with a network, external media, the display, or any other components in controller, or combinations thereof. The connection with the network may be a physical connection, such as a wired Ethernet connection or may be established wirelessly as discussed below. Likewise, the additional connections with other components of the system 100 may be physical connections or may be established wirelessly. The network may alternatively be directly connected to a bus.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by the processor 104 or that cause a computer system to perform any one or more of the methods or operations disclosed herein. The computer-readable medium may be non-transitory and may be tangible. The computer-readable medium can include a solid-state memory such as a memory card or other package that houses one or more non-volatile read-only memories. The computer-readable medium can be a random-access memory or other volatile re-writable memory. Additionally, or alternatively, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The cloud may represent distributed computing resources, software, platform or infrastructure services which can enable data handling, data processing, data management, and/or analytical operations on the data exchanged & transacted amongst the facilities. The system 100 may be connected to the cloud or network. The network may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network may include wide area networks (WAN), such as the Internet, local area networks (LAN), campus area networks, metropolitan area networks, a direct connection such as through a Universal Serial Bus (USB) port, or any other networks that may allow for data communication. The network may be configured to couple one computing device to another computing device to enable communication of data between the devices. The network may generally be enabled to employ any form of machine-readable media for communicating information from one device to another. The network may include communication methods by which information may travel between computing devices. The network may be divided into sub-networks. The sub-networks may allow access to all of the other components connected thereto or the sub-networks may restrict access between the components. The network may be regarded as a public or a private network connection and may include, for example, a virtual private network or an encryption or other security mechanism employed over the public Internet, or the like.

Referring to FIG. 1, the processor 104 is configured to initially transmit a first request from the OPC UA client 102 to at least two historian data sources (112A, 112B, 112C) in a factory environment or network to receive historical data at a first time frame. Here, the first time frame comprises at least a first start-time and a first end-time. For example, the first time frame may be having the first start-time as 10.00 and the first end-time as 11.30. In this case, the OPC UA client 102 may be requested data from the plurality of nodes (114A, 114B, 114C) associated with the historian data sources (112A, 112B, 112C) for a first time frame of one hour thirty minutes (i.e. from 10.00 to 11.30). The plurality of historian data sources (112A, 112B, 112C) comprises, but are not limited to, the first data source 112A and the second data source 112B. The first request is a common request to both the first data source 112A and the second data source 112B of the at least two historian data sources. The first request comprises at least but is not limited to the first time frame for the historical data being requested, and identity of a plurality of nodes (114A, 114B, 114C) associated with the plurality of historian data sources (112A, 112B, 112C) (i.e. at least two historian data source (112A, 112B, 112C) that comprises but is not limited to the first data source 112A and the second data source 112B) in the network.

After transmission of the first request, the processor 104 is configured to receive at least a first response from the plurality of nodes (114A, 114B, 114C) associated with the first data source 112A among the at least two historian data sources (112A, 112B, 112C) at a second time frame. The first response comprises responses from the plurality of nodes (114A, 114B, 114C) associated with both the first data source 112A and the second data source 112B of the plurality of historian data sources (112A, 112B, 112C). For example, the first response may be from two nodes associated with the first data source 112A and from three nodes associated with the second data source 112B. Further, the first response from the first data source 112A of the plurality of historian data sources (112A, 112B, 112C) comprises at least a portion of the historical data available within the second time frame. The second time frame comprises at least the first start-time and a second end-time.

When the first response is received from the at least two historian data sources (112A, 112B, 112C) during the second time frame, then the processor 104 is configured to determine whether the second end-time is different from the first end-time. That is, the processor 104 of the OPC UA client 102 determines whether the second end-time is less than expected end-time (the first end-time) or not. For example, the expected end-time is 11.30 but the second end-time is 11.20 then there might be a missing data during time frame 11.20 to 11.30. That data needs to be retrieved by sending additional request with a new time frame. The detailed signal flow process is further described in connection with FIGS. 2 and 3.

Based on the determination that the second end-time is different from the first end-time, the processor 104 is configured to transmit a second request from the OPC UA client 102 to the first data source 112A with a third time frame. Here, the second request is sent only to the first data source 112A with the third time frame, as the first data source 112A lacks support for continuation points in the data retrieval process. The third time frame comprises but is not limited to at least a third start-time and the first end-time. Further, the third start-time is an incremental value of second end-time and the incremental value may be at least one millisecond. For example, if the second end-time is 11.20 then the incremental value of second end-time may be 11.20.00.001. Here, the incremental value is 1 microsecond. The second request to the first data source of the plurality of historian data sources (112A, 112B, 112C) comprise at least the third time frame for the historical data being requested, and identity of plurality of nodes (114A, 114B, 114C) associated with the first data source of the plurality of historian data sources (112A, 112B, 112C) in the network. Further, the plurality of nodes (114A, 114B, 114C) associated with the first data source 112A is further associated to the first request that is transmitted to the first data source 112A of the plurality of historian data sources (112A, 112B, 112C). Further, the second response comprises at least a portion of the historical data available within the third time frame.

Then, the processor 104 is configured to repeat transmission of further requests to the first data source by incrementing end-time of the new time frame to receive a second response from the first data source, until final end-time matches the first end-time (i.e. the end-time of the desired time frame) to retrieve the historical data within the first time frame. For example, if the first end-time is 11.30, then the final end-time also has to be 11.30 for completing the data retrieval process. Otherwise, additional requests are transmitted to the plurality of nodes (114A, 114B, 114C) associated with the historian data source. After completion of the data retrieval process, the processor 104 is further configured to store the retrieved historical data from the plurality of nodes (114A, 114B, 114C) associated with the plurality of historian data sources (112A, 112B, 112C) for the first time frame. Then, the processor 104 is configured to render, via a user interface of the OPC UA client 102, one or more notifications associated with retrieval of the historical data from the first data source 112A within the first time frame, when the final end-time equals/matches the first end-time. The one or more notifications may be at least one of: audio message, becp sound, email, text message, pop-up notification and the like.

In some embodiments, according to FIG. 1, the processor 104 is further configured to receive at least a first response from a plurality of nodes 114B associated with the second data source 112B of the plurality of historian data sources (112A, 112B . . . 112C) along with a continuation point for each of the plurality of nodes 114B. Here, the continuation point indicates a point from which to resume reading the historical data in the event that not all values can be returned in the first response. Further, the processor 104 is configured to transmit a third request from the OPC UA client 102 to the second data source 112B of the at least two historian data sources (112A, 112B, 112C) along with the continuation point for each of the plurality of nodes 114B. The processor 104 is further configured to receive a second response from the second data source 112B based on the third request. Here, the second data source supports for the continuation point during transmission of the historical data. The processor 104 is further configured to repeat transmission of further requests to the second data source 112B until reception of GoodNoData signal from each of the plurality of nodes 114B associated with the second data sources 112B to retrieve remaining portion of the historical data for the first time frame. The GoodNoData signal refers to a signal from data sources indicating that no data available at a requested node among the plurality of the nodes 114B during a requested time frame. Here, the plurality of nodes 114B associated with the second data source 112B is further associated to the first request transmitted to the second data source 112B of the at least two historian data sources (112A, 112B, 112C).

Considering an example scenario, the OPC UA client 102 initiates a request to retrieve historical data from the historian data sources for a specific time frame (i.e. first time frame) starting at 10.00 and ending at 11.30. This request specifies the desired period to extract data points, ensuring that only information relevant to the defined interval is obtained from the historian data sources. Subsequently, the OPC UA client receives the first response from the historian data source 112A, containing the historical data for the time frame (i.e. second time frame) between 10.00 to 11.20. This response provides a subset of the requested data, corresponding to the specified interval, as part of the ongoing data retrieval process. In this case, the historical data that is being requested for the specified interval (i.e. first time frame) is not retrieved completely as the end-time is not same as expected time frame (i.e. second end-time is not same as first end-time). Consequently, the OPC UA client sends a new request to the historian data source with a new time frame (i.e. third time frame) between 11.20.00.001 and 11.30. Here, the new time frame is configured based on the second end-time and the first end-time. For example, a start-time of the new time frame is set to the second end-time, incremented by one millisecond and an end-time of the new time frame is set to the first end-time. The OPC UA client 102 repeats the transmission of request until the historical data is completely retrieved for the expected time frame (i.e. the first time frame). For instance, the processor 104 is configured to repeatedly send request to the data source that does not support continuation point with the new time frame to retrieve the remaining data from the data source till final end-time reaches the time ending at 11.30 (i.e. first end-time). Thus, the invention provides the solution to retrieve the missing data from the historian data source that lacks support for continuation points, ensuring that no data is lost during the data retrieval process. In case of the data retrieval from the second data source that supports continuation point, the OPC UA client sends a separate request to the second data source 112B using continuation points provided for each of the plurality of nodes 114B associated with the second data source 112B to resume the data retrieval process.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware.

Figure 2:
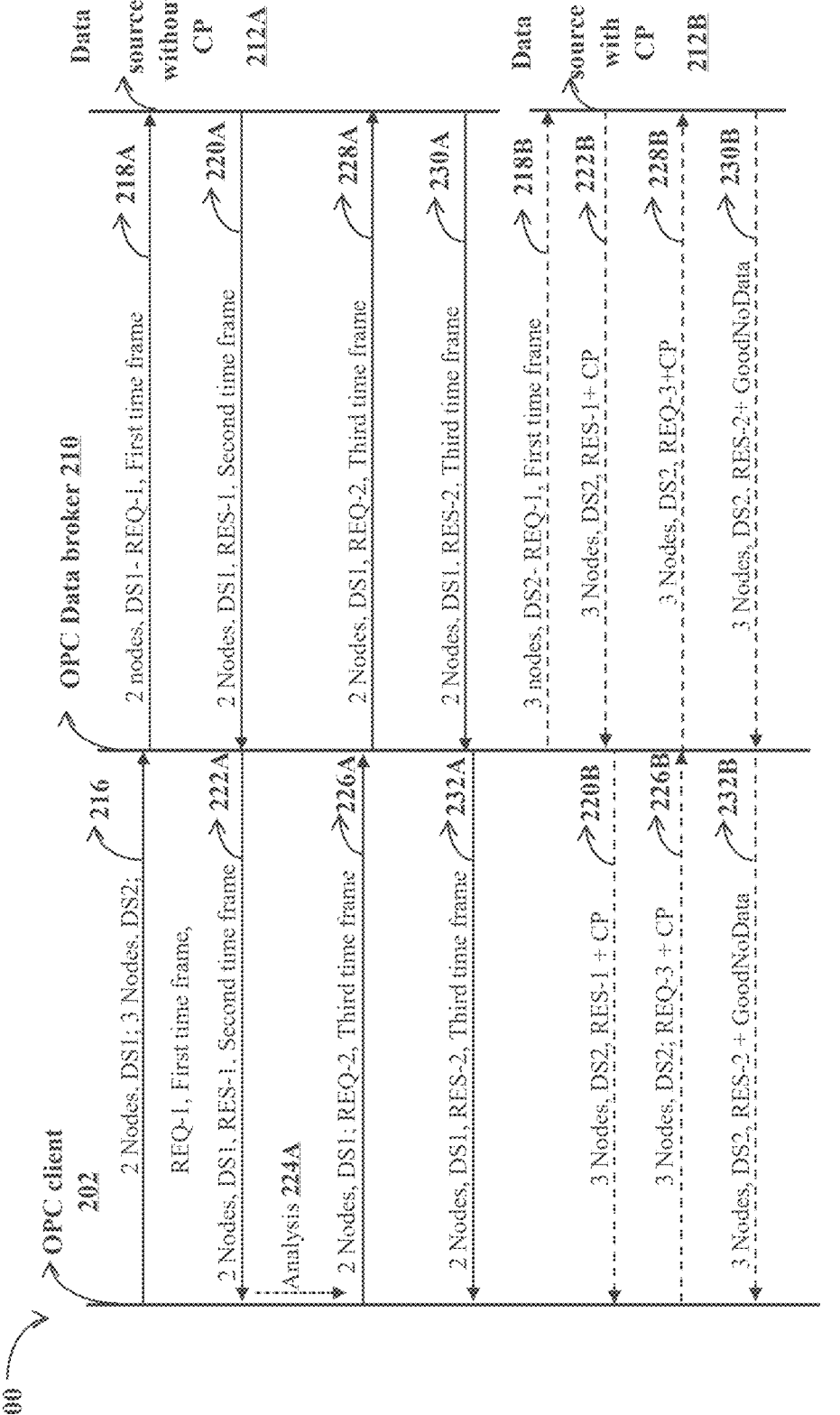
FIG. 2 illustrates an exemplary signal flow diagram of a system for data retrieval using the Open Platform Communication Unified Architecture (OPC UA) Historian data sources in accordance with one or more example embodiments described herein.

FIG. 2 illustrates an exemplary signal flow diagram 200 of a system (as described in connection with FIG. 1) for data retrieval using Open Platform Communication Unified Architecture (OPC UA) Historian data sources in accordance with one or more example embodiments described herein. Specifically, FIG. 2 illustrates the data retrieval process from a plurality of data sources to the OPC UA client via an OPC data broker (for example, Matrikon™ data broker). In the plurality of data sources, one of the plurality of data sources may lack support for continuation point (i.e. a first data source) and another may support for continuation point (i.e. a second data source). When a common request transmitted from the OPC UA client to the plurality of data sources for data retrieval, additional requests may be transmitted to the plurality of data sources based on responses from the plurality of data sources and their capability in supporting continuation point. The additional requests may either specify a new time frame or include a continuation point. For example, the response received from the plurality of nodes having a time frame (i.e. second time frame) less than a requested time frame (i.e. first time frame), then additional requests are transmitted to retrieve remaining data. Referring to FIG. 2, if the response received from requested nodes of the plurality of nodes associated with the first data source having the same time frame, then the additional requests may be transmitted with a new time frame (i.e. third time frame) to the requested nodes.

Referring to FIG. 2, the signal flow of the system 100 for data retrieval using the OPC UA Historian data sources are described in detail with following steps:

At steps 216, 218A, and 218B, the OPC UA client 202 transmits the first request (i.e., REQ-1) to the first data source (DS1) 212A and the second data source (DS2) 212B via the OPC data broker 210. In this, the first data source (DS1) 212A lacks support for the continuation point (for example, PHD) and the second data source (DS2) 212B supports for the continuation point (for example, Matrikon™ Flex SDK Server). The first request REQ-1 specifies the time frame (i.e., the first time frame) for which data retrieval is required. The first time frame comprises at least a first start-time and a first end-time. Additionally, the first request REQ-1 includes the identities of the nodes associated with the data sources DS1 and DS2 (212A, 212B). For instance, the identities of two nodes from the first data source DS1 and the identities of three nodes from the second data source DS2 are included in the first request REQ-1.

At step 220A and step 222A, based on the first request (i.e., REQ-1) from the OPC UA client 202, the OPC UA client 202 receives the first response (i.e., RES-1) from the first data source (DS1) 212A via the OPC data broker 210. The first response received from the first data source (DS1) 212A comprises data samples from the requested nodes associated with the first data source during the second time frame. The second time frame comprises at least a second start-time and a second end-time. For example, if the first time frame is starting at 10.00 and ending at 11.30, then the second time frame is starting at 10.00 and ending at 11.20.

At step 224A, the OPC UA client 202 determines whether the second end-time is less than expected end-time (the first end-time) or not. For example, if the first response from the first data source has an expected end-time of 11:30, but the second end-time is 11:20, there might be missing data for the time frame from 11:20 to 11:30. This missing data needs to be retrieved by sending an additional request with a new time frame (i.e. an incremental time frame). The new time frame may have a start-time as second end-time in addition to an increment value. Further, the new end-time may have an end-time as first end-time (i.e. expected end-time).

At step 226A and step 228A, based on the determination that the second end-time is less than (i.e. different) expected end-time, the OPC UA client 202 transmits the second request (i.e., REQ-2) to the first data source (DS1) 212A via the OPC data broker 210. As the first data source (DS1) 212A lacks support for the continuation point (for example, PHD), the second request REQ-2 specifies the time frame (i.e., the third time frame) for which remaining data retrieval is required. The third time frame comprises at least a third start-time and the first end-time. Additionally, the second request REQ-2 includes the identities of the nodes associated with the first data source DS1 (212A). For instance, the identities of node1 and node2 from the first data source DS1 are included in the second request REQ-2. Here, the same time frame (i.e. the third time frame) is used for both the node1 and node2 because the first response from both the node1 and node2 are received at the same time frame (i.e. second time frame). Otherwise, an individual request with a different time frame must be transmitted to each of the requested nodes (i.e., node1 and node2) associated with the first data source. The exemplary signal flow is further described in connection with FIG. 3. Further, the third start-time is an incremental value of second end-time and the incremental value may be at least one millisecond. For example, if the second end-time is 11.20 then the incremental value of second end-time may be 11.20.00.001 (here, the incremental value is 1 microsecond). The second request to the first data source of the plurality of historian data sources comprise at least the third time frame for the historical data being requested, and identity of both the node1 and node2 associated with the first data source. Further, both the node1 and node2 are further associated to the first request that is transmitted to the first data source of the plurality of historian data sources.

At step 230A and step 232A, based on the second request (i.e., REQ-2) from the OPC UA client 202, the OPC UA client 202 receives the second response (i.e., RES-2) from the first data source (DS1) 212A via the OPC data broker 210. The second response received from the first data source (DS1) 212A comprises data samples from the requested nodes (i.e. Node1 and Node2) associated with the first data source during the third time frame. The third time frame comprises a third start-time and the first end-time, the third start-time is an incremental value of second end-time. For example, if the second time frame is starting at 10.00 and ending at 11.20, then the third time frame is starting at 11.20.00.001 and ending at 11.30. Thus, the remaining portion of the historical data can be retrieved from the first data source that lacks support for continuation point.

Considering the data retrieval from the second data source that support for continuation point, at step 220B and step 222B, based on the first request (i.e., REQ-1) from the OPC UA client 202, the OPC UA client 202 receives the first response (i.e., RES-1) from the second data source (DS2) 212B via the OPC data broker 210. The first response received from the second data source (DS2) 212B comprises data samples from the requested nodes associated with the second data source 212B along with continuation point. For example, the first response (i.e., RES-1) from the second data source 212B comprises historical data samples along with the continuation point from three nodes associated with the second data source 212B. The continuation point (i.e. CP) may be included in the first response to indicate a point from which to resume reading historical data (i.e. previously recorded/stored data available at the second data source) in the event that not all values can be returned in a response (i.e. a single response). For example, in data processing, a continuation point might be where data processing can restart after a failure or interruption.

At step 226B and step 228B, based on the first response from the second data source 212B, the OPC UA client 202 transmits the third request (i.e., REQ-3) to the second data source (DS2) 212B via the OPC data broker 210. As the second data source (DS2) 212B supports for the continuation point (CP), the third request REQ-3 specifies the CP for each of the plurality of nodes associated with the second data source 212B to retrieve the remaining historical data. Additionally, the third request REQ-3 includes the identities of the nodes associated with the second data source DS2 (212B). For instance, the identities of node1, node2 and node3 associated with the second data source DS2 are included in the third request REQ-3. Further, the node1, node2, and node3 are further associated to the first request that is transmitted to the second data source 212B of the plurality of historian data sources.

At step 230B and step 232B, based on the third request (i.e., REQ-3) from the OPC UA client 202, the OPC UA client 202 receives the second response (i.e., RES-2) from the second data source (DS2) 212B via the OPC data broker 210. The second response received from the second data source (DS2) 212B comprises data samples along with GoodNoData signal from the requested nodes (i.e. Node1, Node2, and Node3) associated with the second data source. The GoodNoData signal from each of the plurality of nodes indicating that no data available at the requested nodes (i.e. Node1, Node2, and Node3) among the plurality of the nodes during a requested time frame. In case there is no GoodNoData signal from any of the requested nodes, the process may be repeated until the GoodNoData signal is received from the respective node. Thus, the remaining portion of the historical data can be retrieved from the second data source 212B that support for continuation point.

Figure 3:
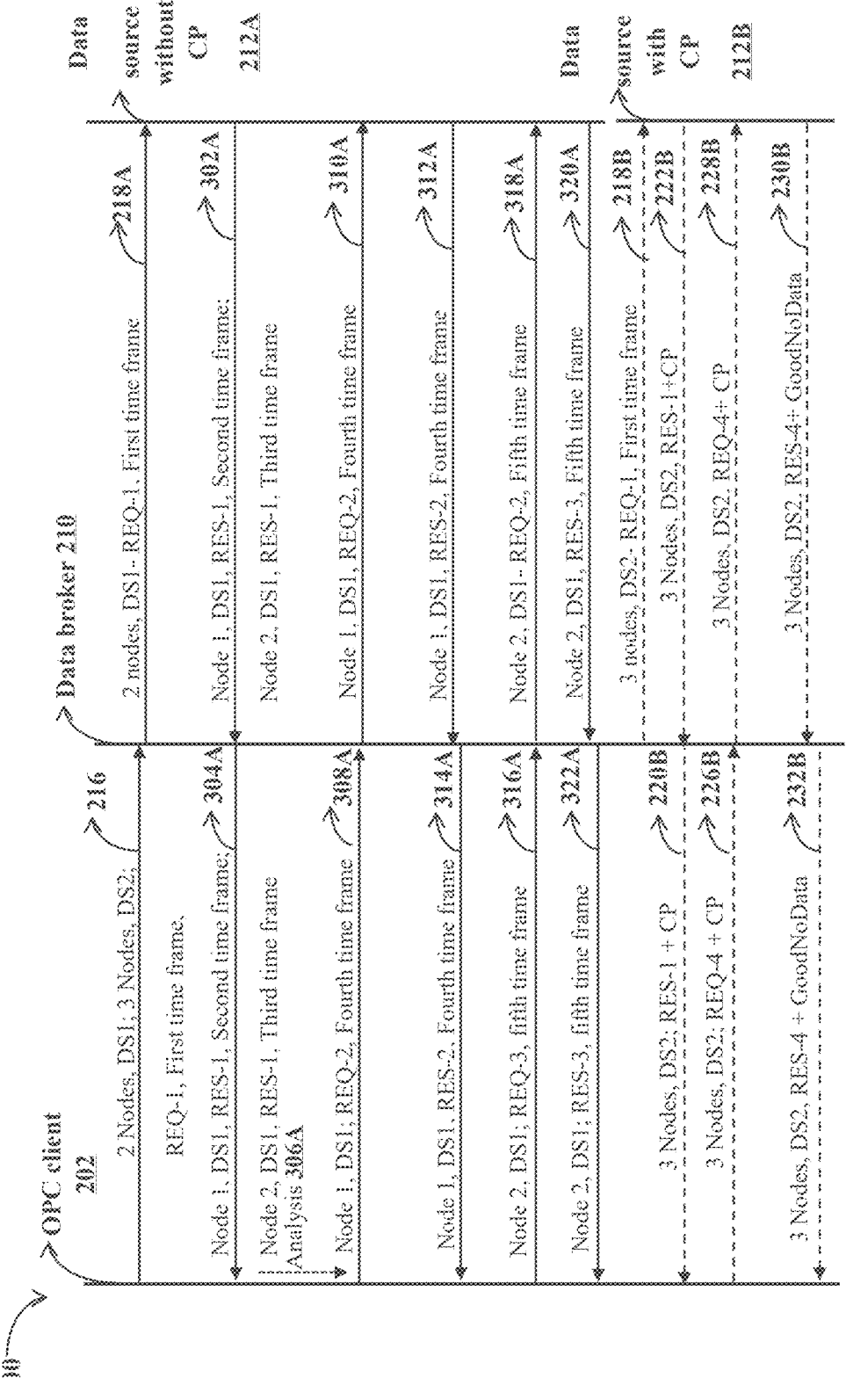
FIG. 3 illustrates another exemplary signal flow diagram of a system for data retrieval using the Open Platform Communication Unified Architecture (OPC UA) Historian data sources in accordance with an alternative embodiment described herein.

FIG. 3 illustrates another exemplary signal flow diagram 300 of a system (as described in connection with FIG. 1 and FIG. 2) for data retrieval using the Open Platform Communication Unified Architecture (OPC UA) Historian data sources in accordance with alternative embodiments described herein. Specifically, FIG. 3 illustrates the data retrieval process from a plurality of data sources to the OPC UA client via an OPC data broker. The OPC data broker may be a Matrikon™ data broker. In the plurality of data sources, one of the plurality of data sources may lack support for continuation point (i.e. a first data source) and another may support for continuation point (i.e. a second data source). When a common request transmitted from the OPC UA client to the plurality of data sources for data retrieval, additional requests may be transmitted to the plurality of data sources based on responses from the plurality of data sources and their capability in supporting continuation point. The additional requests may either specify a new time frame or include a continuation point. For example, the response received from the plurality of nodes having a time frame (i.e. second time frame) less than a requested time frame (i.e. first time frame), then additional requests are transmitted to retrieve remaining data. Referring to FIG. 3, if the responses received from the requested nodes of the plurality of nodes associated with the first data source have different time frames, then additional requests may be transmitted with a new time frame (i.e., a third time frame) to each of the requested nodes individually. Referring to FIG. 3, the signal flow of the system 100 for data retrieval using the OPC UA Historian data sources are described in detail with following steps:

At step 216, 218A, and 218B, the OPC UA client 202 transmits the first request (i.e., REQ-1) to the first data source (DS1) 212A and the second data source (DS2) 212B via the OPC data broker 210. In this, the first data source (DS1) 212A lacks support for the continuation point (for example, PHD) and the second data source (DS2) 212B supports for the continuation point (for example, Matrikon™ Flex SDK Server). The first request REQ-1 specifies the time frame (i.e., the first time frame) for which data retrieval is required. The first time frame comprises at least a first start-time and a first end-time. Additionally, the first request REQ-1 includes the identities of the nodes associated with the data sources DS1 and DS2 (212A, 212B). For instance, the identities of 2 nodes from the first data source DS1 and the identities of 3 nodes from the second data source DS2 are included in the first request REQ-1.

At step 302A and step 304A, based on the first request (i.e., REQ-1) from the OPC UA client 202, the OPC UA client 202 receives the first response (i.e., RES-1) from the first data source (DS1) 212A via the OPC data broker 210. The first response received from the first data source (DS1) 212A comprises data samples from the node1 associated with the first data source during the second time frame, and data samples from the node2 associated with the second data source during the third time frame. The second time frame comprises at least the first start-time and a second end-time. For example, if the first time frame is starting at 10.00 and ending at 11.30, then the second time frame is starting at 10.00 and ending at 10.10. similarly, the third time frame comprises at least the first start-time and a third end-time. For example, if the first time frame is starting at 10.00 and ending at 11.30, then the second time frame is starting at 10.00 and ending at 11.20.

At step 306A, the OPC UA client 202 determines whether the second end-time is less than expected end-time (the first end-time) or not. For example, if the first response from the first data source has an expected end-time of 11:30, but the second end-time is 11:20, there might be missing data for the time frame from 11:20 to 11:30. This missing data needs to be retrieved by sending an additional request with a new time frame (i.e. an incremental time frame). The new time frame may have a start-time as second end-time in addition to an increment value. Further, the new end-time may have an end-time as first end-time (i.e. expected end-time). Similarly, the OPC UA client 202 determines whether the third end-time is less than expected end-time (the first end-time) or not.

At step 308A and step 310A, based on the determination that the second end-time is less than (i.e. different) expected end-time (i.e. first end-time), the OPC UA client 202 transmits the second request (i.e., REQ-2) to the node1 of the first data source (DS1) 212A via the OPC data broker 210. As the first data source (DS1) 212A lacks support for the continuation point (for example, PHD), the second request REQ-2 specifies the time frame (i.e., the fourth time frame) for which remaining data retrieval is required. The fourth time frame comprises at least a fourth start-time and the first end-time. Additionally, the second request REQ-2 includes the identities of the node1 associated with the first data source DS1 (212A). Further, the fourth start-time is an incremental value of second end-time and the incremental value may be at least one millisecond. For example, if the second end-time is 10.10 then the incremental value of second end-time may be 10.10.00.001 (here, the incremental value is 1 microsecond). That is, the fourth start-time is 10.10.00.001. Further, the node1 is further associated to the first request that is transmitted to the first data source of the plurality of historian data sources.

At step 312A and step 314A, based on the second request (i.e., REQ-2) from the OPC UA client 202, the OPC UA client 202 receives the second response (i.e., RES-2) from the node1 of the first data source (DS1) 212A via the OPC data broker 210. The second response received from the first data source (DS1) 212A comprises data samples from the requested nodes (i.e. Node1) associated with the first data source during the fourth time frame. The fourth time frame comprises a fourth start-time and the first end-time, the fourth start-time is an incremental value of second end-time. Thus, the remaining portion of the historical data can be retrieved from the node1 of the first data source that lacks support for continuation point.

At step 316A and step 318A, based on the determination that the third end-time is less than (i.e. different) expected end-time (i.e. first end-time), the OPC UA client 202 transmits the third request (i.e., REQ-3) to the node2 of the first data source (DS1) 212A via the OPC data broker 210. As the first data source (DS1) 212A lacks support for the continuation point (for example, PHD), the third request REQ-3 specifies the time frame (i.e., the fifth time frame) for which remaining data retrieval is required. The fifth time frame comprises at least a fifth start-time and the first end-time. Additionally, the third request REQ-3 includes the identities of the node2 associated with the first data source DS1 (212A). Further, the fifth start-time is an incremental value of third end-time and the incremental value may be at least one millisecond. For example, if the third end-time is 11.20 then the incremental value of third end-time may be 11.20.00.001 (here, the incremental value is 1 microsecond). That is, fifth start-time is 11.20.00.001. Further, the node2 is further associated to the first request that is transmitted to the first data source of the plurality of historian data sources.

At step 320A and step 322A, based on the third request (i.e., REQ-3) from the OPC UA client 202, the OPC UA client 202 receives the third response (i.e., RES-3) from the node2 of the first data source (DS1) 212A via the OPC data broker 210. The third response received from the node2 of the first data source (DS1) 212A comprises data samples from the requested nodes (i.e. Node2) associated with the first data source during the fifth time frame. The fifth time frame comprises a fifth start-time and the first end-time, the fifth start-time is an incremental value of third end-time. In case the first end-time does not match with final end-time of latest response, then repeat transmission of further requests to the first data source until final end-time matches the first end-time to retrieve remaining portion of the historical data for the first time frame. Thus, the remaining portion of the historical data can be retrieved from the node2 of the first data source that lacks support for continuation point.

Considering the data retrieval from the second data source that supports continuation points, the steps from 218B to 230B are similar to the operations described in FIG. 2. At step 220B and step 222B, based on the first request (i.e., REQ-1) from the OPC UA client 202, the OPC UA client

202 receives the first response (i.e., RES-1) from the second data source (DS2) 212B via the OPC data broker 210. The first response received from the second data source (DS2) 212B comprises data samples from the requested nodes associated with the second data source 212B along with continuation point. For example, the first response (i.e., RES-1) from the second data source 212B comprises historical data samples along with the continuation point from three nodes associated with the second data source 212B. The continuation point (i.e. CP) may be included in the first response to indicate a point from which to resume reading historical data (i.e. previously recorded/stored data available at the second data source) in the event that not all values can be returned in a response (i.e. a single response). For example, in data processing, a continuation point might be where data processing can restart after a failure or interruption.

At step 226B and step 228B, based on the first response from the second data source 212B, the OPC UA client 202 transmits the fourth request (i.e., REQ-4) to the second data source (DS2) 212B via the OPC data broker 210. As the second data source (DS2) 212B supports for the continuation point (CP), the fourth request REQ-4 specifies the CP for each of the plurality of nodes associated with the second data source 212B to retrieve the remaining historical data. Additionally, the fourth request REQ-4 includes the identities of the nodes associated with the second data source DS2 (212B). For instance, the identities of node1, node2 and node3 associated with the second data source DS2 are included in the fourth request REQ-4. Further, the node1, node2, and node3 are further associated to the first request that is transmitted to the second data source 212B of the plurality of historian data sources.

At step 230B and step 232B, based on the fourth request (i.e., REQ-4) from the OPC UA client 202, the OPC UA client 202 receives the second response (i.e., RES-2) from the second data source (DS2) 212B via the OPC data broker 210. The second response received from the second data source (DS2) 212B comprises data samples along with GoodNoData signal from the requested nodes (i.e. Node1, Node2, and Node3) associated with the second data source. The GoodNoData signal from each of the plurality of nodes indicating that no data available at the requested nodes (i.e. Node1, Node2, and Node3) among the plurality of nodes during a requested time frame. In case there is no GoodNoData signal from any of the requested nodes, the process may be repeated until the GoodNoData signal is received from the respective node. Thus, the remaining portion of the historical data can be retrieved from the second data source 212B that support for continuation point.

Referring now to FIG. 4, example methods in accordance with various embodiments of the present disclosure are illustrated. In some examples, each block or step of the flowchart, and combinations of blocks and/or steps in the flowchart, may be implemented by various means such as hardware, circuitry and/or other devices associated with execution of software including one or more computer program instructions.

In some examples, one or more of the procedures described in the figures may be embodied by computer program instructions, which may be stored by a memory circuitry (such as a non-transitory memory) of an apparatus employing an embodiment of the present disclosure and executed by a processing circuitry (such as a processor 104) of the apparatus. These computer program instructions may direct the apparatus to function in a particular manner, such that the instructions stored in the memory circuitry may produce an article of manufacture, the execution of which may implement the function specified in the flowchart block(s). Further, the apparatus may comprise one or more other components, such as, for example, a communication circuitry and/or an input/output circuitry. Various components of the apparatus may be in electronic communication between and/or among each other to transmit data to and/or receive data from each other.

In some examples, embodiments may take the form of a computer program product on a non-transitory computer-readable storage medium storing computer-readable program instructions (e.g. computer software). Any suitable computer-readable storage medium may be utilized including non-transitory hard disks, CD-ROMs, flash memory, optical storage devices, and/or magnetic storage devices.

FIG. 4 illustrates an exemplary method 400 for data retrieval using the Open Platform Communication Unified Architecture (OPC UA) Historian data sources in accordance with one or more example embodiments described herein. In some examples, the method 400 may be performed by a processor 104 (for example, a processor 104 of the OPC UA client 102 described in connection with FIGS. 1-3). Referring to FIG. 4, the method 400 for data retrieval using the OPC UA Historian data source from OPC UA client perspective is described. Specifically, FIG. 4 describes the method for data retrieval using the OPC UA Historian data source that lacks support for continuation point.

The method 400 begins at step 402, at which the processor comprised in the OPC UA client (such as, but not limited to, the OPC UA client 102 thereof as described above in connection with FIG. 1) may transmit a first request to the plurality of historian data sources. The plurality of historian data sources may comprise at least a first data source and a second data source. In this the first data source lacks support for continuation point and the second data source supports continuation data point. Initially, the processor may transmit a first request from the OPC UA client to at least two historian data sources in a factory environment or network to receive historical data at a first time frame. Here, the first time frame comprises at least a first start-time and a first end-time. For example, the first time frame may be having the first start-time as 10.00 and the first end-time as 11.30. In this case, the OPC UA client may be requested data from the plurality of nodes associated with the historian data sources for a first time frame of one hour thirty minutes (i.e. from 10.00 to 11.30). The plurality of historian data sources comprises, but are not limited to, the first data source 112A and the second data source 112B. The first request is a common request to the first data source and the second data source of the at least two historian data sources. The first request comprises at least but is not limited to the first time frame for the historical data being requested, and identity of a plurality of nodes associated with the plurality of historian data sources (i.e. at least two historian data source that comprises but is not limited to the first data source and the second data source) in the network.

At step 404, the processor may receive at least a first response from the plurality of nodes associated with a first data source of the at least two historian data sources at a second time frame. The first response comprises responses from the plurality of nodes associated with both the first data source and the second data source of the plurality of historian data sources. For example, the first response may be from two nodes associated with the first data source and from three nodes associated with the second data source. Further, the first response from the first data source of the plurality of historian data sources comprises at least a portion of the historical data available within the second time frame. The second time frame comprises at least the first start-time and a second end-time.

At step 406, the processor may determine whether the second end-time is different from the first end-time, when the first response is received from the at least two historian data sources during the second time frame. That is, the processor 104 of the OPC UA client 102 determines whether the second end-time is less than expected end-time (the first end-time) or not. For example, the expected end-time is 11.30 but the second end-time is 11.20 then there might be a missing data during time frame 11.20 to 11.30. This missing data needs to be retrieved by sending an additional request with a new time frame (i.e. an incremental time frame). The new time frame may have a start-time as second end-time in addition to an increment value. Further, the new end-time may have an end-time as first end-time (i.e. expected end-time). The detailed signal flow process is further described in connection with FIGS. 2 and 3.

At step 408, the processor may transmit a second request from the OPC UA client to the first data source with a third time frame, based on the determination that the second end-time is different from the first end-time. Here, the second request is sent only to the first data source with the third time frame, as the first data source lacks support for continuation points in data retrieval process. The third time frame comprises but is not limited to at least a third start-time and the first end-time. Further, the third start-time is an incremental value of second end-time and the incremental value may be at least one millisecond. For example, if the second end-time is 11.20 then the incremental value of second end-time may be 11.20.00.001. Here, the incremental value is 1 microsecond. The second request to the first data source of the plurality of historian data sources comprise at least the third time frame for the historical data being requested, and identity of plurality of nodes associated with the first data source of the plurality of historian data sources in the network. Further, the plurality of nodes associated with the first data source is further associated to the first request that is transmitted to the first data source of the plurality of historian data sources. Further, the second response comprises at least a portion of the historical data available within the third time frame.

At step 410, the processor may repeat transmission of further requests to the first data source by incrementing end-time of new time frames to receive a second response from the first data source, until final end-time matches the first end-time (i.e. the end-time of the desired time frame). Here the final end-time refers to the end-time specified in the responses received for the additional requests sent by the processor. When the processor sends multiple requests to the data source to retrieve historical data, each response may cover a different time frame. The 'final end-time' is the end-time of the last response received, which completes the data retrieval process for the entire specified period (i.e. the first time frame).

At step 412, the processor may retrieve the historical data within the first time frame. For example, if the first end-time is 11.30 then the final end-time also has to be 11.30 to complete the data retrieval process. Otherwise, additional requests are transmitted to the plurality of nodes associated with the historian data source.

At step 414, the processor may store the retrieved historical data from the plurality of nodes associated with the plurality of historian data sources for the first time frame, after completion of the data retrieval process.

At step 416, the processor may render, via a user interface of the OPC UA client, one or more notifications associated with retrieval of the historical data from the first data source within the first time frame when the final end-time equals/matches the first end-time. The one or more notifications may be at least one of: audio message, beep sound, email, text message, pop-up notification and the like.

In some embodiments, the processor may receive at least a first response from a plurality of nodes associated with the second data source of the plurality of historian data sources (112A, 112B . . . 112C) along with a continuation point for each of the plurality of nodes. Here, the continuation point indicates a point from which to resume reading the historical data in the event that not all values can be returned in the first response. Further, the processor may transmit a third request from the OPC UA client 102 to the second data source of the at least two historian data sources along with the continuation point for each of the plurality of nodes. The processor may receive a second response from the second data source based on the third request. Here, the second data source supports for the continuation point during transmission of the historical data. The processor may repeat transmission of further requests to the second data source until reception of GoodNoData signal from each of the plurality of nodes associated with the second data sources to retrieve remaining portion of the historical data for the first time frame. The GoodNoData signal refers to a signal from the data source indicating that no data available at a requested node among the plurality of the nodes during a requested time frame. Here, the plurality of nodes associated with the second data source is further associated to the first request transmitted to the second data source of the at least two historian data sources.

In an example scenario, considering a sugar manufacturing unit. In the sugar manufacturing unit, there may be multiple phases or levels in the manufacturing process, such as a feeder unit to feed molasses, a shredder to shred the molasses, an extraction unit to extract juice from the molasses, a clarifier unit to clean and process the juice, an evaporator unit to evaporate the juice, a centrifugal unit to solidify the juice, a storage unit to store the solidified sugar, and a packaging and dispatch unit. When the sugar manufacturing unit complies with Industry 4.0 (IE 4.0) standards and operates on the OPC UA protocol, all assets involved in each phase of the manufacturing process are identified and managed as assets. For instance, this includes the milling train in the feeder unit, pipes and boilers in the extraction unit, rotary filters in the centrifugal units, heaters, and various other components throughout the factory. The asset information from these components is gathered by the underlying layers, specifically layers L1, L2, and L3, using Programmable Logic Controllers (PLCs) and Supervisory Control and Data Acquisition (SCADA) systems. The data collected by these PLCs and SCADA systems in layer L4 is then connected to OPC UA historians, which operate on the OPC UA protocol, ensuring seamless data communication and integration across the manufacturing process.

For instance, if the health and maintenance of the evaporation unit in the sugar manufacturing unit has to be monitored, it is required to consider various components of the sugar manufacturing unit. The sugar manufacturing unit typically includes at least a motor, condenser plate, separator, scraper, cooler, and other parts, each equipped with multiple sensors. These sensors continuously collect data on the performance and condition of each component. In this case, collecting historical data for the evaporation unit over a one-year period results in a significant volume of data and this bulk data is transmitted from sensors associated with the evaporation unit through network layers of the sugar manufacturing unit until it reaches the OPC UA historians in layer L4. These OPC UA historians or data sources are responsible for storing and managing the historical data. However, it's important to note that the OPC UA historians may or may not support continuation points, which are necessary for efficiently handling large datasets over extended periods. In this case, implementation of the present invention can provide solution to automatically detect the presence of historical data within a specified time frame for any requests made to such a data source. This means that when a request for historical data is made, the system can determine whether the requested data exists within the given time frame, even if the data source does not inherently support continuation points.

Additionally, the present invention includes the system designed to retrieve any missing data from the historical data or records within the desired time frame. This ensures that all necessary data is collected, even if some data points were initially missed. By doing so, the system helps to prevent data loss, ensuring that all relevant historical data is available for analysis and decision-making. In summary, the present invention enhances the reliability and completeness of data retrieval from OPC UA historian data sources that lacks support for the continuation points, by automatically identifying available data and retrieving any missing information within the specified time frame.

The present invention offers a solution that complies with the industry 4.0 (IE 4.0) Standard while operating on the OPC UA protocol. This solution is designed to be agnostic of any specific industry vertical, meaning it can be applied across various sectors without being tailored to a particular industry. By adhering to the IE 4.0 Standard, the invention ensures compatibility with modern industrial automation and data exchange requirements. The use of the OPC UA protocol, which is known for its platform-independent and secure communication capabilities, further enhances the system's versatility and interoperability. In summary, this invention not only addresses the challenges of data retrieval from OPC UA historian data sources but also aligns with the broader goals of Industry 4.0, providing a robust and flexible solution that can be utilized across different industries.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A system comprising:

one or more processors; and one or more memory including instructions executable by the one or more processors, wherein the one or more processors is configured to:

transmit a first request from an Open Platform Communication Unified Architecture (OPC UA) client to at least two historian data sources in a network to receive historical data at a first time frame, wherein the first time frame comprises a first start-time and a first end-time;

receive at least a first response from a plurality of nodes associated with a first data source of the at least two historian data sources at a second time frame, wherein the second time frame comprises the first start-time and a second end-time;

determine that the second end-time is different from the first end-time, when the first response received from the at least two historian data sources during the second time frame;

transmit a second request from the OPC UA client to the first data source of the at least two historian data sources with a third time frame to receive a second response from the first data source, wherein the first data source lacks support for continuation point during transmission of the historical data, wherein the third time frame comprises a third start-time and the first end-time, the third start-time is an incremental value of second end-time;

repeat transmission of further requests to the first data source until final end-time matches the first end-time to retrieve remaining portion of the historical data for the first time frame; and render, via a user interface of the OPC UA client, one or more notifications associated with retrieval of the historical data from the first data source within the first time frame, when the final end-time matches the first end-time.

2. The system of claim 1, wherein the first request to the at least two historian data sources comprise at least: the first time frame for the historical data being requested, and identity of plurality of nodes associated with the at least two historian data sources in the network.

3. The system of claim 1, wherein the first response from the first data source of the at least two historian data sources comprise at least a portion of the historical data available within the second time frame; and wherein the second response comprises at least a portion of the historical data available within the third time frame.

4. The system of claim 1, wherein the second request to the first data source of the to at least two historian data sources comprise at least: the third time frame for the historical data being requested, and identity of plurality of nodes associated with the first data source of the at least two historian data sources in the network.

5. The system of claim 1, wherein the plurality of nodes associated with the first data source is further associated to the first request that is transmitted to the first data source of the at least two historian data sources.

6. The system of claim 1, wherein the one or more processors is further configured to store the retrieved historical data from the plurality of nodes associated with the at least two historian data sources for the first time frame.

7. The system of claim 1, wherein the incremental value is at least one millisecond.

8. The system of claim 1, wherein the one or more processors is further configured to:
   receive at least a first response from a plurality of nodes associated with a second data source of the at least two historian data sources along with a continuation point for each of the plurality of nodes, wherein the continuation point indicates a point from which to resume reading the historical data in the event that not all values returned in the first response;
   transmit a third request from the OPC UA client to the second data source of the at least two historian data sources along with the continuation point for each of the plurality of nodes;
   receive a second response from the second data source based on the third request, wherein the second data source supports for the continuation point during communication of the historical data with the OPC UA client; and
   repeat transmission of further requests to the second data source until reception of GoodNoData signal from each of the plurality of nodes associated with the second data sources to retrieve remaining portion of the historical data for the first time frame.

9. The system of claim 8, wherein the plurality of nodes associated with the second data source is further associated to the first request transmitted to the second data source of the at least two historian data sources.

10. A method, comprising:
   transmitting, by a processor, a first request from an Open Platform Communication Unified Architecture (OPC UA) client to at least two historian data sources in a network to receive historical data at a first time frame, wherein the first time frame comprises a first start-time and a first end-time;
   receiving, by the processor, at least a first response from a plurality of nodes associated with the at least two historian data sources at a second time frame, wherein the second time frame comprises the first start-time and a second end-time;
   determining, by the processor, that the second end-time is different from the first end-time when the first response received from the at least two historian data sources during the second time frame;
   transmitting, by the processor, a second request from the OPC UA client to a first data source of the at least two historian data sources with a third time frame to receive a second response from the first data source, wherein the first data source lacks support for continuation point during transmission of the historical data; wherein the third time frame comprises a third start-time and the first end-time, the third start-time is an incremental value of second end-time;
   repeating, by the processor, transmission of further requests to the first data source until final end-time matches the first end-time to retrieve remaining portion of the historical data for the first time frame; and
   rendering, by the processor via a user interface of the OPC UA client, one or more notifications associated with retrieval of the historical data from the first data source within the first time frame, when the final end-time matches the first end-time.

11. The method of claim 10, wherein the first request to the at least two historian data sources comprise at least: the first time frame for the historical data being requested, and identity of plurality of nodes associated with the at least two historian data sources in the network.

12. The method of claim 10, wherein the first response from the first data source of the at least two historian data sources comprise at least: a portion of the historical data available within the second time frame; and wherein the second response comprises at least a portion of the historical data available within the third time frame.

13. The method of claim 10, wherein the second request to the first data source of the to at least two historian data sources comprise at least the third time frame for the historical data being requested, and identity of plurality of nodes associated with the first data source of the at least two historian data sources in the network.

14. The method of claim 10, wherein the plurality of nodes associated with the first data source is further associated to the first request that is transmitted to the first data source of the at least two historian data sources.

15. The method of claim 10, the method further comprising:
   storing the retrieved historical data from the plurality of nodes associated with the at least two historian data sources for the first time frame.

16. The method of claim 10, wherein the incremental value is at least one millisecond.

17. The method of claim 10, the method further comprising:
   receiving, by the processor, at least a first response from a plurality of nodes associated with a second data source of the at least two historian data sources along with a continuation point for each of the plurality of nodes, wherein the continuation point indicates a point from which to resume reading the historical data in the event that not all values returned in the first response;
   transmitting, by the processor, a third request from the OPC UA client to the second data source of the at least two historian data sources along with the continuation point for each of the plurality of nodes;
   receiving, by the processor, a second response from the second data source based on the third request, wherein the second data source supports for the continuation point during communication of the historical data with the OPC UA client; and
   repeating, by the processor, transmission of further requests to the second data source until reception of GoodNoData signal from each of the plurality of nodes associated with the second data sources to retrieve remaining portion of the historical data for the first time frame.

18. The method of claim 17, wherein the plurality of nodes associated with the second data source is further associated to the first request transmitted to the second data source of the at least two historian data sources.

19. The method of claim 17, wherein the GoodNoData signal from each of the plurality of nodes associated with the second data sources indicates that no data available at a requested node among the plurality of the nodes during a requested time frame.

20. A computer program product comprising at least one non-transitory computer-readable storage medium having computer-readable program code portions stored therein, the computer-readable program code portions comprising an executable portion configured to:

transmit a first request from an Open Platform Communication Unified Architecture (OPC UA) client to at least two historian data sources in a network to receive historical data at a first time frame, wherein the first time frame comprises a first start-time and a first end-time;

receive at least a first response from a plurality of nodes associated with a first data source of the at least two historian data sources at a second time frame, wherein the second time frame comprises the first start-time and a second end-time;

determine that the second end-time is different from the first end-time, when the first response received from the at least two historian data sources during the second time frame;

transmit a second request from the OPC UA client to the first data source of the at least two historian data sources with a third time frame to receive a second response from the first data source, wherein the first data source lacks support for continuation point during transmission of the historical data; wherein the third time frame comprises a third start-time and the first end-time, the third start-time is an incremental value of second end-time;

repeat transmission of further requests to the first data source until final end-time matches the first end-time to retrieve remaining portion of the historical data for the first time frame; and render, via a user interface of the OPC UA client, one or more notifications associated with retrieval of the historical data from the first data source within the first time frame when the final end-time matches the first end-time.

*    *    *    *    *